(12) United States Patent
Meguriya et al.

(10) Patent No.: US 6,251,990 B1
(45) Date of Patent: Jun. 26, 2001

(54) SILICONE RUBBER COMPOSITIONS HAVING HIGH-VOLTAGE ELECTRICAL INSULATION, SEALING AND REPAIRING COMPOUNDS FOR POLYMERIC INSULATORS

(75) Inventors: Noriyuki Meguriya; Syuuichi Azechi; Susumu Sekiguchi, all of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/379,896

(22) Filed: Aug. 24, 1999

(30) Foreign Application Priority Data

Aug. 24, 1998 (JP) .................................................. 10-253263

(51) Int. Cl.⁷ .............................. C08L 83/04; C08K 3/10; C08K 3/36
(52) U.S. Cl. .................. 524/862; 524/227; 524/437; 524/588; 524/728; 524/731; 524/786; 528/31; 528/15
(58) Field of Search ..................... 524/786, 437, 524/862, 227, 588, 731, 728; 528/31

(56) References Cited

U.S. PATENT DOCUMENTS

| | | |
|---|---|---|
| 3,511,698 | 5/1970 | Talcott . |
| 3,965,065 | 6/1976 | Elliot . |
| 4,476,155 | 10/1984 | Niemi . |
| 4,539,367 | * 9/1985 | Beers . |
| 4,618,646 | * 10/1986 | Takago et al. . |
| 5,019,419 | * 5/1991 | Matsumoto et al. . |
| 5,264,603 | * 11/1993 | Altes et al. . |
| 5,519,080 | 5/1996 | Matsuhita et al. . |
| 5,674,936 | * 10/1997 | Lucas . |
| 5,691,407 | * 11/1997 | Azechi et al. . |
| 5,973,047 | * 10/1999 | Ernst et al. . |

FOREIGN PATENT DOCUMENTS

| | | |
|---|---|---|
| 59-198604 | 11/1984 | (JP) . |
| 7-57574 | 3/1995 | (JP) . |

OTHER PUBLICATIONS

Japanese abstract JP–A 53–35982; Apr. 3, 1978.

* cited by examiner

Primary Examiner—Robert Dawson
Assistant Examiner—Marc S. Zimmer
(74) Attorney, Agent, or Firm—Birch, Stewart, Kolasch & Birch, LLP

(57) ABSTRACT

A thixotropic silicone rubber composition comprising (A) an organopolysiloxane having on the average at least two alkenyl groups in a molecule and a degree of polymerization of up to 1,200, (B) a liquid organohydrogenpolysiloxane having at least two hydrogen atoms each attached to a silicon atom, (C) aluminum hydroxide, (D) an addition reaction catalyst, (E) a thixotropic agent, and optionally (F) a tackifier cures at room temperature or elevated temperature into a silicone rubber having high strength and electrical insulating properties sufficient to serve as a high-voltage electrical insulator. The composition is so thixotropic that it may be used in repairing chipped portions of insulators.

15 Claims, 1 Drawing Sheet

SILICONE RUBBER COMPOSITIONS HAVING HIGH-VOLTAGE ELECTRICAL INSULATION, SEALING AND REPAIRING COMPOUNDS FOR POLYMERIC INSULATORS

This invention relates to a silicone rubber composition which cures at room temperature or elevated temperature into a silicone rubber serving as a high-voltage electrical insulator and which has a sufficient thixotropy to serve as a sealant or repairing compound for use in the repair, fabrication and assembly of silicone rubber or EPDM-coated ceramics and glass insulators or bushings. It also relates to sealing and repairing compounds for use with polymeric insulators or bushings.

BACKGROUND OF THE INVENTION

In general, high-voltage electrical insulating materials for use as insulators and bushings for power transmission lines are of porcelain (ceramics) or glass. Since these insulators are heavy and liable to breakage due to a lack of impact resistance, they require careful handling and impose a burden to workers. In a polluted environment as in seaside areas and industrial areas, there is a tendency that dust, salts and mist attach to the surface of high-voltage electrical insulators, causing leakage currents and dry band discharge leading to flashover failure.

In order to eliminate the drawbacks of ceramic and glass insulators, a number of proposals have been made. For example, U.S. Pat. No. 3,511,698 discloses a weathering resistant high-voltage electrical insulator comprising a member of a thermosetting resin and a platinum catalyst-containing organopolysiloxane elastomer. JP-A 59-198604 corresponding to U.S. Pat. No. 4,476,155 proposes a one-part room temperature curable organopolysiloxane composition which is applied to the outer surface of an electrical insulator of glass or porcelain so that the electrical insulator may maintain its high insulating properties even in the presence of moisture, polluted air, ultraviolet radiation and other outdoor stresses.

JP-A 53-35982 corresponding to U.S. Pat. No. 3,965,065 discloses that a silicone rubber composition with improved electrical insulation is obtained by heating a mixture of an organopolysiloxane capable of heat curing into silicone rubber and aluminum hydrate at temperatures above 100° C. for more than 30 minutes. JP-A 7-57574 corresponding to U.S. Pat. No. 5,519,080 describes that the blending of a methylalkylsiloxane fluid in silicone rubber is effective for providing contact angle recovery with time and preventing flashover failure.

However, the silicone rubber materials used in the prior art techniques mentioned above are not yet fully satisfactory in high-voltage electrical insulation. They must be loaded with large amounts of aluminum hydroxide in order to improve the electrical insulation. This raises a new problem that a high loading of aluminum hydroxide reduces the strength of silicone rubber and renders the silicone rubber brittle. As a consequence, molded parts are often damaged during molding, during attachment and by external factors (weather conditions, human attacks as by gunshots, and bird and animal attacks) after molding.

SUMMARY OF THE INVENTION

An object of the invention is to provide a silicone rubber composition which cures at room temperature or elevated temperature into a silicone rubber having sufficiently high strength and improved electrical insulating properties to serve as a high-voltage electrical insulator and which has a sufficient thixotropy to serve as a sealant and repairing compound for use with polymeric insulators. Another object of the invention is to provide a sealant and a repairing compound for use with polymeric insulators.

The inventors have found that a silicone rubber composition comprising as main components, (A) an organopolysiloxane represented by the average compositional formula (1) defined below and having on the average at least two alkenyl groups in a molecule and a degree of polymerization of up to 1,200, (B) an organohydrogenpolysiloxane having at least two hydrogen atoms each attached to a silicon atom represented by the average compositional formula (2) defined below and being liquid at room temperature, (C) aluminum hydroxide, (D) an addition reaction catalyst, and (E) a thixotropic agent, and exhibiting a thixotropy corresponding to a sag of up to 1 inch after 1 minute as measured by the Boeing flow jig test cures at room temperature or elevated temperature into a silicone rubber having sufficiently high strength and improved electrical insulating properties to serve as a high-voltage electrical insulator. The silicone rubber composition has a sufficient thixotropy to serve as a sealant and repairing compound for use in the repair, fabrication and assembly of silicone rubber or EPDM-coated ceramics and glass insulators or bushings.

More particularly, since the silicone rubber composition for use as a high-voltage electrical insulator according to the invention has a high strength, improved high-voltage electrical insulating properties, and thixotropy at the same time, the composition can be used to fill up defects in insulator caps or disks without detrimental influence on the electrical insulating properties of the insulator itself. Curing of the composition can be finished within a short time by allowing it to stand at room temperature or by heating it by means of a dryer and so, the repair is simple and brief. By way of example, silicone rubber-coated insulator bushings generally use a core of fiber-reinforced plastic (FRP) and a support of metallic material because of the insufficient strength of rubber itself. If a conventional sealant is applied between these materials, the insulator can be damaged first at the seal. The use of the inventive composition as an insulator sealant has the advantages that it can be easily applied due to its thixotropy and it does not adversely affect the electrical insulating properties of the insulator bushing.

According to the invention, there is provided a silicone rubber composition for use as a high-voltage electrical insulator, comprising (A) 100 parts by weight of an organopolysiloxane represented by the following average compositional formula (1):

wherein $R^1$ is a substituted or unsubstituted monovalent hydrocarbon group, 0.01 to 10 mol % of $R^1$ is alkenyl, at least 90 mol % of $R^1$ is methyl, and a is a positive number of 1.9 to 2.4, said organopolysiloxane having on the average at least two alkenyl groups in a molecule and a degree of polymerization of up to 1,200, (B) 0.1 to 50 parts by weight of an organohydrogenpolysiloxane having at least two hydrogen atoms each attached to a silicon atom of the following average compositional formula (2):

$$R^2_b H_c SiO_{(4-b-c)/2} \quad (2)$$

wherein $R^2$ is a substituted or unsubstituted monovalent hydrocarbon group having 1 to 10 carbon atoms, b is a positive number of 0.7 to 2.1, c is a positive number of 0.001 to 1.0, and the sum of b+c is from 0.8 to 3.0, said organohydrogenpolysiloxane being liquid at room temperature, (C) 40 to 400 parts by weight of aluminum hydroxide, (D) a catalytic amount of an addition reaction catalyst, (E) 0.1 to 50 parts by weight of a thixotropic agent, and (F) 0 to 30 parts by weight of a tackifier.

The composition exhibits a thixotropy corresponding to a sag of up to 1 inch after 1 minute as measured by the Boeing flow jig test.

In another aspect, the invention provides a sealant and a repairing compound, each for use with a polymeric insulator and comprising the silicone rubber composition defined above.

BRIEF DESCRIPTION OF THE DRAWINGS

The only FIGURE, FIG. 1 schematically illustrates an assembly of insulator disks having chipped portions to be repaired by applying the silicone rubber composition of the invention.

DESCRIPTION OF THE PREFERRED EMBODIMENTS

Figure 1:
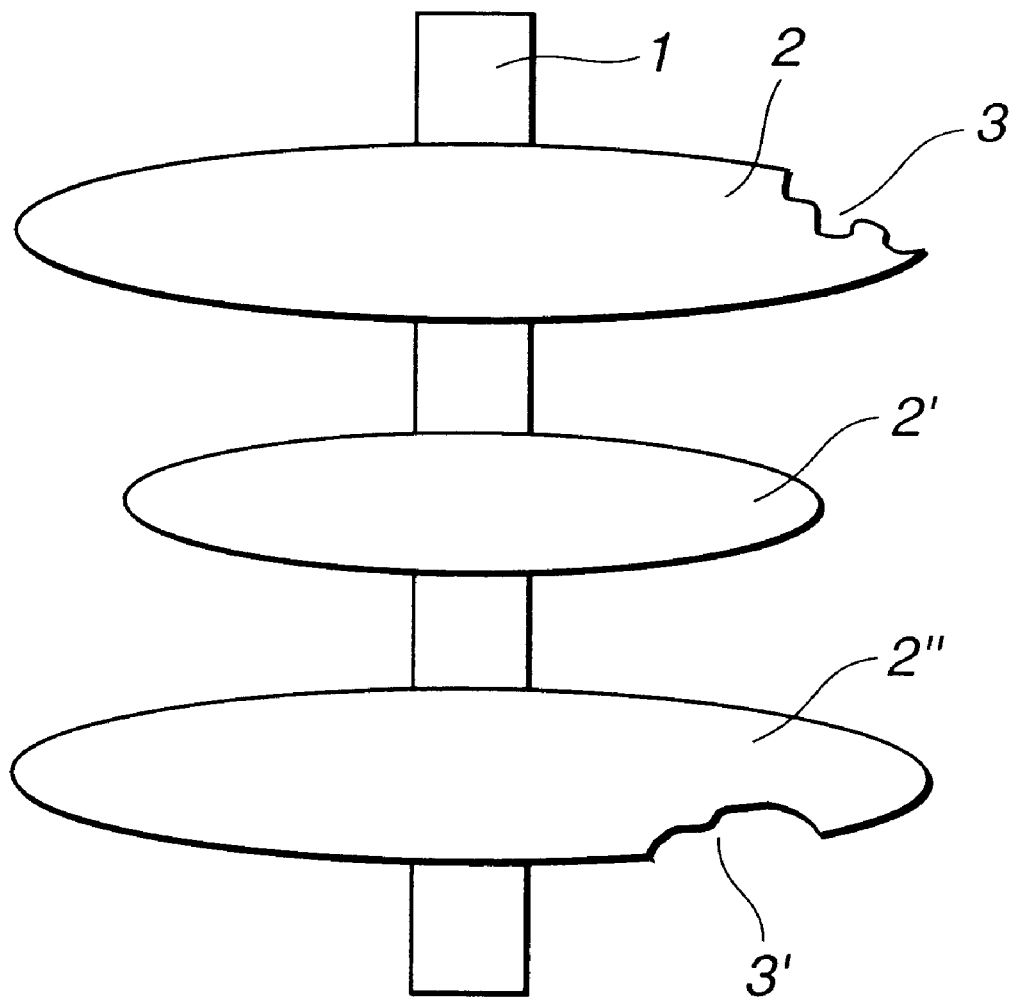

According to the invention, the silicone rubber composition for use as a high-voltage electrical insulator is an addition curing type silicone rubber composition comprising the components (A) to (E) and optional component (F) as main components. It cures into a rubbery elastomer when it is allowed to stand at room temperature or heated.

Component (A) is an organopolysiloxane having on the average at least two alkenyl groups each attached to a silicon atom in a molecule. It is the main component (base polymer) of the silicone rubber composition. It is represented by the following average compositional formula (1).

$$R^1_a SiO_{(4-a)/2} \quad (1)$$

$R^1$, which may be the same or different, is a substituted or unsubstituted monovalent hydrocarbon group, preferably of 1 to 10 carbon atoms, more preferably of 1 to 8 carbon atoms, and a is a positive number of 1.9 to 2.4, and preferably 1.98 to 2.05.

Examples of the substituted or unsubstituted monovalent hydrocarbon group attached to the silicon atom, represented by $R^1$, include alkyl groups such as methyl, ethyl, propyl, isopropyl, butyl, isobutyl, tert-butyl, pentyl, neopentyl, hexyl, cyclohexyl, octyl, nonyl, and decyl; aryl groups such as phenyl, tolyl, xylyl and naphthyl; aralkyl groups such as benzyl, phenylethyl, and phenylpropyl; alkenyl groups such as vinyl, allyl, propenyl, isopropenyl, butenyl, hexenyl, cyclohexenyl, and octenyl; and substituted ones of the foregoing groups in which some or all of the hydrogen atoms attached to carbon atoms are replaced by halogen atoms (e.g., fluorine, bromine and chlorine) or cyano groups, for example, halogen-substituted alkyl groups and cyano-substituted alkyl groups such as chloromethyl, chloropropyl, bromoethyl, trifluoropropyl, and cyanoethyl.

At least two of the $R^1$ groups must be alkenyl groups, preferably of 2 to 8 carbon atoms, more preferably of 2 to 6 carbon atoms. The content of alkenyl groups is 0.01 to 10 mol %, preferably 0.1 to 5 mol % of the $R^1$ groups. The alkenyl groups may be attached to a silicon atom at the end or midway of the molecular chain or both. The organopolysiloxane used herein should preferably have at least an alkenyl group attached to the silicon atom at the both ends of its molecular chain when the curing rate of the composition and physical properties of the cured product are taken into account. At least 90 mol %, preferably at least 95 mol % of $R^1$ is methyl.

With respect to the structure, the organopolysiloxane basically has a linear structure, that is, a diorganopolysiloxane skeleton consisting of recurring diorganosiloxane units represented by $R^1_2 SiO_{2/2}$ as the backbone blocked with triorganosiloxy groups represented by $R^1_3 SiO_{1/2}$ at the both ends of its molecular chain, while it may partially contain a branched structure (including $R^1 SiO_{3/2}$ units or $SiO_2$ units). It may also have a cyclic structure in the entirety of its molecule.

The organopolysiloxane should have a degree of polymerization of up to 1,200, preferably 50 to 1,000, more preferably 100 to 800. Notably, the degree of polymerization corresponds to the number of silicon atoms in the molecule. A degree of polymerization of less than 50 indicates a short molecular chain, which would be difficult to impart rubber elasticity to the cured product. An organopolysiloxane with a degree of polymerization of more than 1,200 has a too high viscosity, giving rise to a problem in application for repair and sealing purposes. The above-defined range of degree of polymerization corresponds to a viscosity of about 200 to about 100,000 centipoise at 25° C., especially about 500 to about 50,000 centipoise at 25° C.

Component (B) is an organohydrogenpolysiloxane having at least two hydrogen atoms each attached to a silicon atom of the following average compositional formula (2):

$$R^2_b H_c SiO_{(4-b-c)/2} \quad (2)$$

wherein $R^2$ is a substituted or unsubstituted monovalent hydrocarbon group having 1 to 10 carbon atoms, letter b is a positive number of 0.7 to 2.1, c is a positive number of 0.001 to 1.0, and the sum of b+c is from 0.8 to 3.0. This organohydrogenpolysiloxane is liquid at room temperature (for example, 25° C.).

The organohydrogenpolysiloxane acts as a crosslinker for curing the silicone rubber composition so that the hydrogen atoms each attached to a silicon atom (that is, SiH groups) in component (B) are addition reacted with the alkenyl groups each attached to a silicon atom in component (A) to crosslink.

The organohydrogenpolysiloxane should preferably have in its molecule at least two, preferably at least three hydrogen atoms each attached to a silicon atom (that is, SiH groups). It usually has in its molecule up to 200, preferably up to 100 hydrogen atoms each attached to a silicon atom (SiH groups), although the upper limit of the SiH group number is not restricted thereto. The SiH groups may be attached to a silicon atom at the end or midway of the molecular chain or both.

Examples of the $R^2$ group in formula (2) are the same as exemplified for $R^1$. Those groups free of an aliphatic unsaturated bond are preferred (that is, preferably, alkenyl groups are excluded). The preferred $R^2$ is methyl group, ethyl group, propyl group, 3,3,3-trifluoropropyl group and phenyl group.

Exemplary organohydrogenpolysiloxanes (B) include 1,1,3,3-tetramethyldisiloxane, methylhydrogensiloxane-dimethylsiloxane cyclic copolymers, methylhydrogen cyclic polysiloxane, both end trimethylsiloxy-blocked methylhydrogenpolysiloxane, both end trimethylsiloxy-blocked dimethylsiloxane-methylhydrogensiloxane copolymers, both end dimethylhydrogensiloxy-blocked dimethylpolysiloxane, both end dimethylhydrogensiloxy-blocked dimethylsiloxane-methylhydrogensiloxane copolymers, both end trimethylsiloxy-blocked methylhydrogensiloxane-diphenylsiloxane copolymers, both end trimethylsiloxy-blocked methylhydrogensiloxane-diphenyl-siloxane-dimethylsiloxane copolymers, both end dimethylhydrogensiloxy-blocked methylhydrogensiloxane-diphenylsiloxane-dimethylsiloxane copolymers, copolymers of $(CH_3)_2HSiO_{1/2}$ units and $SiO_{4/2}$ units, copolymers of $(CH_3)_2HSiO_{1/2}$ units, $(CH_3)_3SiO_{1/2}$ units and $SiO_{4/2}$ units, and copolymers of $(CH_3)_2HSiO_{1/2}$ units, $SiO_{4/2}$ units, and $(C_6H_5)_3SiO_{3/2}$ units. Their molecular structure may be linear, branched, cyclic or three-dimensional network structure (resinous). The number of silicon atoms in a molecule, that is, the degree of polymerization is preferably about 2 to 200, more preferably about 4 to 100. The organohydrogenpolysiloxane is liquid at room temperature (for example, 25° C.), and usually has a viscosity of about 0.2 to 1,000 centipoise, preferably about 0.5 to 500 centipoise at 25° C.

The organohydrogenpolysiloxane (B) is blended in an amount of 0.1 to 50 parts, preferably 0.3 to 20 parts by weight per 100 parts by weight of the organopolysiloxane (A). Differently stated, the organohydrogenpolysiloxane (B) is blended in such an amount that about 0.5 to 10 mol, preferably about 0.8 to 5 mol of silicon atom-attached hydrogen atoms (SiH groups) In component (B) are available per mol of alkenyl groups in component (A).

Component (C) is aluminum hydroxide which is essential for improving the electrical insulating properties, typically arc resistance and tracking resistance, of silicone rubber. Aluminum hydroxide used herein is represented by the formula (3) or (3').

$$Al_2O_3 \cdot 3H_2O \quad (3)$$

$$Al(OH)_3 \quad (3')$$

Preferably aluminum hydroxide is in particulate form having a mean particle size of about 0.1 to about 20 μm, especially about 0.5 to about 15 μm and a specific surface area of about 0.5 to 15 m²/g, especially about 1 to 10 m²/g as measured by a BET method. The mean particle size can be determined as a weight average value (or median diameter) by means of a particle size distribution meter using laser light diffractometry and similar analysis means.

Preferably, aluminum hydroxide is surface treated prior to use because better electrical insulating properties are expectable. Illustratively, aluminum hydroxide is surface treated in a conventional manner with organosilazanes including hexaorganodisilazanes and octaorganotrisilazanes such as divinyltetramethyldisilazane, tetravinyldimethyldisilazane, hexamethyldisilazane, and octamethyltrisilazane; organoalkoxysilanes including organotrialkoxysilanes and diorganodialkoxysilanes such as methyltriethoxysilane, ethyltrimethoxysilane, phenyltriethoxysilane, vinyltrimethoxysilane, vinyltriethoxysilane and dimethyldimethoxysilane; organochlorosilanes such as methyltrichlorosilane and ethyltrichlorosilane; titanate coupling agents and partial hydrolyzates thereof; dimethylpolysiloxane oil and methylhydrogenpolysiloxane; organic acids such as lauric acid and stearic acid; and mixtures of any two or more of the foregoing compounds.

Component (C) or aluminum hydroxide is blended in an amount of about 40 to about 400 parts, preferably about 60 to about 300 parts by weight per 100 parts by weight of the organopolysiloxane (A). On this basis, less than 40 parts of aluminum hydroxide fail to accomplish satisfactory electrical insulating properties such as tracking resistance. More than 400 parts of aluminum hydroxide is difficult to blend or work and results in a hard brittle cured part.

Component (D) is an addition reaction catalyst which may be selected from platinum base catalysts such as platinum black, platinic chloride, chloroplatinic acid, reaction products of chloroplatinic acid with monohydric alcohols, complexes of chloroplatinic acid with olefins, complexes of chloroplatinic acid with vinylsiloxanes and platinum bisacetoacetate, palladium base catalysts, and rhodium base catalysts.

The amount of the addition reaction catalyst added is a catalytic amount and is usually from about 1 to 1,000 ppm, especially about 5 to 200 ppm of platinum group metal based on the weight of components (A) and (B) combined.

Component (E) is a thixotropic agent which may be any of compounds capable of suppressing the flow of a silicone rubber composition and imparting thixotropy thereto. No particular limit is imposed on the form of the thixotropic agent. That is, the thixotropic agent may be either solid or liquid at room temperature (25° C.).

In general, solid thixotropic agents include fumed silica, fumed titanium oxide, and carbon. They are desirably fine powders having a mean particle size of about 0.005 to 200 μm, preferably about 0.01 to 100 μm (for example, determined as a weight average value or median diameter by means of a particle size analyzer based on laser light diffractometry) or a specific surface area of at least about 50 m²/g, preferably about 50 to 400 m²/g (for example, as measured by the BET method). Since these solid materials have on the surface a multiplicity of active hydroxyl groups which contribute to the development of thixotropy, it is recommended to use the solid materials as such without surface treatment. When the solid materials are surface treated with organosilicon compounds including organosilazanes, organosilanes and organopolysiloxanes such as hexamethyldisilazane, tetramethyldivinyldisilazane, tetravinyldimethyldisilazane, vinyltrimethoxysilane, vinyltriethoxysilane, trimethylchlorosilane and dimethylpolysiloxane, the surface treatment should be done to such an extent that some active hydroxyl groups are left on the surface. If surface treatment is done until hydroxyl groups on the surface are entirely blocked, the resulting material would fail to impart the desired thixotropy.

As to liquid thixotropic agents, there may be used any of thixotropic compounds which are incompatible with the silicone rubber composition (for example, in the dimethylsiloxane matrix) or have at least two hydrogen-bonding functional groups (e.g., hydroxyl, alkoxy, epoxy, amino, isocyanate, carbonyl, ester and carboxyl groups, ether oxygen linkage, or carboxylic acid anhydride group) in a molecule, especially at least two such functional groups attached to different carbon atoms or different silicon atoms in a molecule. Typical examples are polyfunctional alcohols such as glycidol, ethylene glycol, and glycerol; ketones and esters such as acetoacetic acid esters, hydroxyalkyl (meth) acrylate alkyl phthalates; polyether compounds (polyalkylene oxides and polyalkylene glycol) such as polyethylene oxide, polypropylene oxide, polyethylene glycol and polypropylene glycol, and block polymers thereof with siloxane compounds; carboxylic acid anhydrides such as tetracarboxylic dianhydrides having an aromatic ring or aromatic rings (for example, benzenetetracarboxylic dianhydride (pyromellitic dianhydride), benzophenonetetracarboxylic dianhydride, 3,3',4,4'-biphenyltetracarboxylic dianhydride, bis(3,4-dicarboxyphenyl)ether dianhydride, bis(3,4-dicarboxyphenyl)methane dianhydride, and bis(3,4-dicarboxyphenyl)propane dianhydride); and copolymers of dimethylsiloxane and diphenylsiloxane. Those liquid materials having at least two hydroxyl groups in a molecule, for example, α,ω-dihydroxydimethylpolysiloxane (that is, both end silanol group-blocked linear dimethylpolysiloxane) can be used even if they are compatible with the silicone rubber composition.

Furthermore, organo(hydrogen)polysiloxanes and isocyanurate derivatives, each having at least two hydrogen-bonding functional groups (e.g., epoxy and alkoxy groups) attached to different carbon atoms or different silicon atoms in a molecule, which are included in the tackifier (F) to be described later, may also be used as the liquid thixotropic agent (E).

It is desired to use as the thixotropic agent a mixture of a solid one and a liquid one both as mentioned above. The combined use of solid and liquid thixotropic agents is more effective for imparting thixotropy. Although the selection of solid and liquid thixotropic agents to form a mixture thereof is not critical, it is preferred to use a combination of a finely divided solid material with a liquid material incompatible with the silicone rubber composition, especially a combination of fumed silica with a polyether (polyalkylene glycol or polyalkylene oxide). With respect to the blending ratio, it is preferred to blend the solid material and the liquid material in a weight ratio of from 100:1 to 1:100, especially from 50:1 to 1:10. Mixtures of solid and liquid materials in a weight ratio outside the range would fail to achieve a further improvement in thixotropy.

The thixotropic agent (E) is blended in an amount of 0.1 to 50 parts, preferably 0.2 to 30 parts, more preferably 0.5 to 20 parts by weight per 100 parts by weight of the organopolysiloxane (A). Less than 0.1 part of the thixotropic agent fails to impart thixotropy whereas more than 50 parts of the thixotropic agent adversely affects moldability and rubber physical properties. The thixotropic agents may be used alone or in admixture of two or more as mentioned above.

Component (F) is a tackifier or adhesion-promoting agent. When the composition is used as a sealant or repairing compound, the tackifier is optionally used in the silicone rubber composition for enhancing the adhesion thereof to a substrate. The tackifier used herein may be any of known tackifiers which are used in conventional addition reaction curing type organopolysiloxane compositions. Examples include triallyl isocyanurate and alkoxysilyl-modified products thereof, allyl glycidyl ether, organopolysiloxanes having at least three epoxy functional groups in a molecule, and organpolysiloxanes having at least two silicon atom-bonded hydrogen atoms (SiH groups) and at least one epoxy functional group and/or at least one alkoxysilyl group in a molecule. Of the siloxane compounds, linear or cyclic siloxane oligomers having about 4 to about 20 silicon atoms in a molecule are preferred. Illustrative examples of the tackifier are given below.

(a)
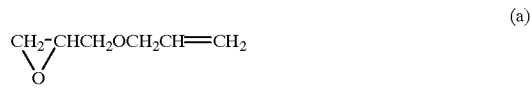

(b)
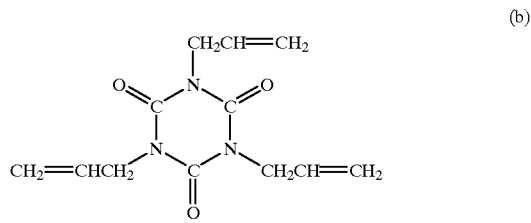

(c)
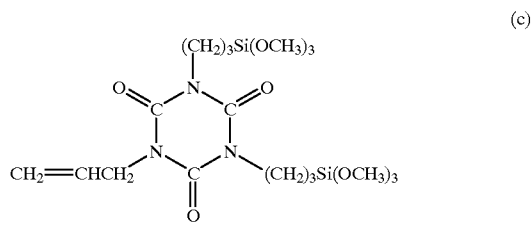

(d)
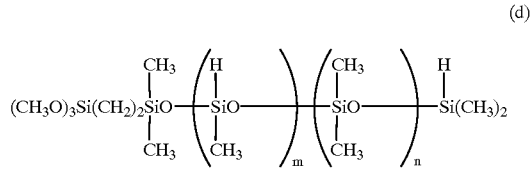

(e)
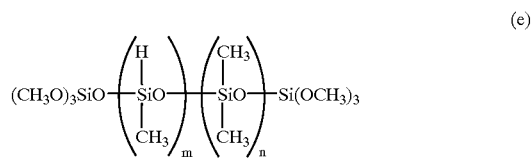

Letters m and n are integers satisfying $m \geq 2$, $n \geq 1$, and $3 \leq m+n \leq 20$.

(f)
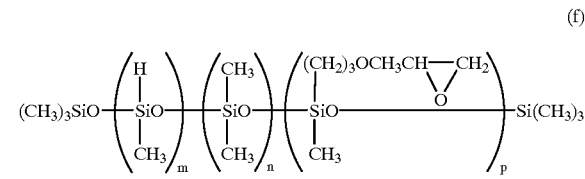

Letters m, n and p are integers satisfying $m \geq 2$, $n \geq 1$, $p \geq 1$, and $4 \leq m+n+p \leq 20$.

(g)
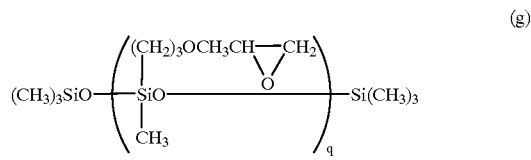

Letter q is an integer from 3 to 20.

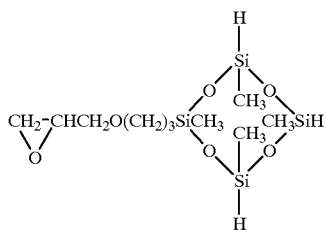

(h)

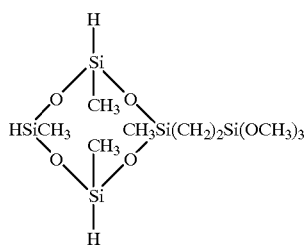

(i)

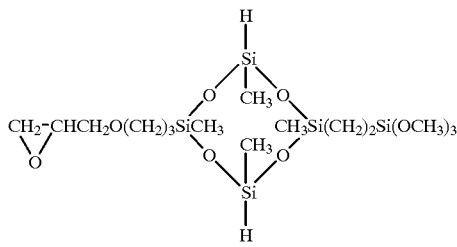

(j)

Of these exemplary compounds, compounds (c), (e), (f), (g), and (j) are isocyanurate derivatives, organopolysiloxanes or organohydrogenpolysiloxanes having at least two epoxy or alkoxy groups which are hydrogen-bonding functional groups attached to different carbon atoms or different silicon atoms in a molecule, and they can be also used as the thixotropic agent (E) in liquid state.

The amount of the tackifier blended is 0 to about 30 parts, preferably about 0.1 to 20 parts, more preferably about 0.5 to 15 parts by weight per 100 parts by weight of component (A). More than 30 parts of the tackifier would retard the cure of a composition and adversely affect the physical properties (hardness and strength) of a cured part.

In addition to the above essential components (A) to (E) and optional component (F), a filler may be blended for adjusting the viscosity of the composition and improving the weather resistance of a molded part insofar as the objects of the invention are not impaired. Exemplary such fillers are precipitated silica, ground quartz (crystalline silica), diatomaceous earth, asbestos, aminosilicic acid, iron oxide, zinc oxide, and calcium carbonate. These fillers may be blended as such or after surface treatment with organosilicon compounds such as hexamethylsilazane, tetramethyldivinyldisilazane, vinyltriethoxysilane, trimethylchlorosilane and polydimethylsiloxane. Additionally, pigments, heat resistance modifiers, flame retardants and plasticizers may be blended insofar as the objects of the invention are not impaired.

The silicone rubber composition of the invention comprising the above-defined components (A) to (E) as essential components should be thixotropic. As a measure of thixotropy, the silicone rubber composition should show a sag of up to 1 inch, preferably 0 to 0.8 inch, more preferably 0 to 0.6 inch, after 1 minute as measured by the Boeing flow jig test (defined below). With a sag of more than 1 inch, when the composition is applied to insulator or bushing disks for repair or applied as a sealant, the composition will flow down, failing to maintain the desired shape.

Boeing Flow Jig Test

This test is to determine the extent of restraining a test composition from sagging. A composition is placed in a bowl of a Boeing flow jig, and a horizontal test jig is placed upright with one end down so that the composition flows vertically downward from the bowl on the scale. The amount of the composition that flows downward under gravity is measured after 60 seconds as the distance (inch) of the flow. Although measurement is normally made after 35 seconds, measurement is herein made after 60 seconds in order to provide a definite difference among the relevant compositions.

The silicone rubber composition of the invention may be prepared by uniformly mixing the above essential and optional components in a rubber milling machine such as a twin-roll mill, Banbury mixer, dough mixer or kneader, optionally followed by heat treatment. It is recommended to premix a part of organopolysiloxane (A) with a filler to form a base compound and thereafter, mix the base compound with the remainder of organopolysiloxane (A), organohydrogenpolysiloxane (B), aluminum hydroxide (C), addition reaction catalyst (D), thixotropic agent (E) and optionally tackifier (F) and other optional components.

The thus obtained silicone rubber composition can be advantageously used as a sealing or repairing compound for polymeric insulators or bushings. By various forming methods such as casting, coating, compression molding and extrusion molding, the composition is applied to silicone rubber or EPDM-coated ceramic or glass bushings to fill up fractured portions to achieve sealing or repairing. Curing conditions may be suitably determined. For use as a repairing compound, curing at room temperature (about 5 to 35° C.) is preferable. In the event of compression molding in a mold, appropriate curing is effected at 120 to 220° C. for about 5 minutes to about 1 hour. When the composition is applied to fractured portions of insulators or bushings for filling up and reshaping, it is recommended to previously apply a primer to the fractured portions. Suitable primers are carbon functional silane primers and organohydrogenpolysiloxane primers commercially available under the trade name of Primer No. 4, Primer No. 101A/B and X-33-144 from Shin-Etsu Chemical Co., Ltd.

There has been described a silicone rubber composition which on curing at room temperature or elevated temperature, provides a silicone rubber having high strength and electrical insulating properties sufficient to serve as a high-voltage electrical insulator and which has a satisfactory thixotropy. The composition can be used in repairing defects in bushings or insulators without detracting from the electrical insulating properties thereof. When a bushing is formed and assembled from a plastic core and a metallic support, the composition is used to establish a tough seal between the core and the support without detracting from the electrical insulating performance. Therefore, the composition is useful as a sealing or repairing compound for use in the fabrication and assembly or repair of silicone rubber or EPDM-coated ceramic and glass insulators.

EXAMPLE

Examples of the invention are given below by way of illustration and not by way of limitation. All parts are by weight. It should be noted that fumed silica blended in the preparation of silicone rubber bases (I) to (III) described below was completely surface treated with hexamethyldisilazane, during the silicone rubber base preparation step, and, therefore, does not exert thixotropic properties in the silicone rubber compositions. Accordingly, fumed silica blended in the silicone rubber bases (I) to (III) is not a thixotropic agent, component (E), according to the present invention.

Example 1

A kneader/mixer was charged with 80 parts of a dimethylpolysiloxane blocked with a dimethylvinylsiloxy group at each end, having a viscosity of 10,000 centipoise at 25° C. and a degree of polymerization of about 500, 40 parts of fumed silica (Aerosil 200 by Nippon Aerosil K. K.), 6 parts of hexamethyldisilazane, and 2 parts of water. The contents were mixed for one hour at room temperature (25° C.), then heated until an internal temperature of 150° C. was reached, and mixed for a further 3 hours at the temperature, yielding a liquid silicone rubber base (I).

To 40 parts of the liquid silicone rubber base (I) were added 60 parts of a dimethylpolysiloxane blocked with a dimethylvinylsiloxy group at each end, having a viscosity of 1,000 centipoise at 25° C. and a degree of polymerization of about 200, 140 parts of aluminum hydroxide having a mean particle size of 1 μm (H42M by Showa Denko K. K.), 2 parts of fumed silica (Aerosil 300 by Nippon Aerosil K. K.) as a thixotropic agent (E), and 0.5 part of polyethylene glycol as a thixotropic agent (E). After 30 minutes of mixing, 2.2 parts of methylhydrogen-polysiloxane of the formula (4) shown below, 0.3 part of a 1% isopropyl alcohol solution of chloroplatinic acid, and 0.05 part of ethynyl cyclohexanol as a reaction inhibitor were added. Mixing was done at room temperature until uniform, obtaining a silicone rubber composition. When tested by the Boeing flow jig test, the composition showed a sag of less than 0.1 inch after 1 minute.

methylhydrogenpolysiloxane:

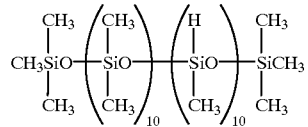

(4)

The silicone rubber composition was press molded at 120° C. for 10 minutes into rubber sheets of 6 mm and 2 mm thick. The sheet of 2 mm thick was measured for physical properties (hardness, tensile strength and elongation) according to JIS K6301. The results are shown in Table 1. The sheet of 6 mm thick was subject to a tracking test and an erosion loss test, both described below. The results are shown in Table 2.

Tracking Test

The test was according to the standard ASTM D-2303-64T. To a test assembly with an electrode-to-electrode distance of 50 mm under an applied voltage of 4 kV, a foul solution (an aqueous solution containing 0.1% of $NH_4Cl$ and 0.02% of nonionic surfactant) was applied dropwise from the upper electrode at a rate of 0.6 ml/min. A time taken until a track was created to turn conductive was measured.

Erosion Weight Loss

An erosion weight loss (% by weight) which represents a degree of deterioration of rubber sheet by heat and spark during the tracking test was determined.

Erosion weight loss (wt %)=(weight loss by erosion)/(weight of sheet before test)×100%

Also, the use of the silicone rubber composition as a repairing compound was evaluated. FIG. 1 illustrates an insulator assembly including insulator disks 2, 2', 2" of silicone rubber supported by a fixture 1. The insulator disks 2, 2" had been damaged at 3, 3'. After Primer No. 4 (Shin-Etsu Chemical Co., Ltd.) was applied to the chipped portions 3, 3' and dried, the silicone rubber composition was applied and shaped to fill up the chipped portions and allowed to stand one day. The fill firmly bonded to the silicone rubber of the disks, indicating that the chipped portions were satisfactorily repaired.

Example 2

A kneader/mixer was charged with 80 parts of a dimethylpolysiloxane blocked with a dimethylvinylsiloxy group at each end, having a viscosity of 10,000 centipoise at 25° C. and a degree of polymerization of about 500, 40 parts of fumed silica (Aerosil 300 by Nippon Aerosil K. K.), 5 parts of hexamethyldisilazane, 3 parts of a dimethylpolysiloxane blocked with a dimethylhydroxysiloxy group at each end, having an average degree of polymerization of 10 as a thixotropic agent (E), and 2 parts of water. The contents were mixed for one hour at room temperature (25° C.), then heated until an internal temperature of 150° C. was reached, mixed for a further 3 hours at the temperature, yielding a liquid silicone rubber base (II).

To 40 parts of the liquid silicone rubber base (II) were added 60 parts of a dimethylpolysiloxane blocked with a dimethylvinylsiloxy group at each end, having a viscosity of 1,000 centipoise at 25° C. and a degree of polymerization of about 200, 140 parts of aluminum hydroxide (H42M by Showa Denko K. K.), and 1 part of fumed silica (Aerosil 300 by Nippon Aerosil K. K.) as a thixotropic agent (E). After 30 minutes of mixing, 2.2 parts of methylhydrogenpolysiloxane of formula (4), 0.3 part of a 1% isopropyl alcohol solution of chloroplatinic acid, and 0.05 part of ethynyl cyclohexanol as a reaction inhibitor were added. Mixing was done at room temperature until uniform, obtaining a silicone rubber composition. When tested by the Boeing flow jig test, the composition showed a sag of 0.25 inch after 1 minute.

As in Example 1, the silicone rubber composition was press molded into rubber sheets, which were measured for physical properties and subjected to the tracking test and the erosion loss test. The results are shown in Tables 1 and 2.

Also, as in Example 1, the silicone rubber composition was applied and shaped to fill up the chipped portions 3, 3' of the insulator disks shown in FIG. 1 and allowed to stand one day. The fill firmly bonded to the silicone rubber of the disks, indicating satisfactory repair. It is noted that in order to maintain the shape, the fill in the chipped portion 3' was partially cured at the surface using a dryer, before it was allowed to stand one day.

Example 3

To 40 parts of the liquid silicone rubber base (I) obtained in Example 1 were added 60 parts of a dimethylpolysiloxane blocked with a dimethylvinylsiloxy group at each end, having a viscosity of 1,000 centipoise at 25° C. and a degree of polymerization of about 200, 120 parts of aluminum hydroxide having a mean particle size of 8 μm (H32 by Showa Denko K. K.), 2 parts of benzenetetracarboxylic dianhydride as a thixotropic agent (E), and 3 parts of epoxy and trimethoxysilyl group-containing organohydrogensiloxane represented by the formula (5) shown below as a thixotropic agent (E). After one hour of mixing at room temperature, 2.0 parts of methylhydrogenpolysiloxane of formula (4), 0.3 part of a 1% isopropyl alcohol solution of chloroplatinic acid, and 0.05 part of ethynyl cyclohexanol as a reaction inhibitor were added. Mixing was done at room temperature until uniform, obtaining a silicone rubber composition. When tested by the Boeing flow jig test, the composition showed a sag of 0.3 inch after 1 minute.

organohydrogensiloxane:

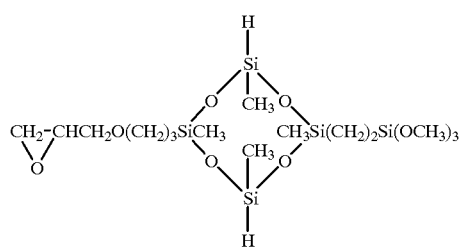

(5)

As in Example 1, the silicone rubber composition was press molded into rubber sheets, which were measured for physical properties and subjected to the tracking test and the erosion loss test. The results are shown in Tables 1 and 2.

Also, as in Example 1, the silicone rubber composition was applied and shaped to fill up the chipped portions 3, 3' of the insulator disks shown in FIG. 1 and allowed to stand one day. The fill firmly bonded to the silicone rubber of the disks, indicating satisfactory repair. It is noted that in order to maintain the shape, the fill in the chipped portion 3' was partially cured at the surface using a dryer, before it was allowed to stand one day.

Example 4

To 40 parts of the liquid silicone rubber base (I) obtained in Example 1 were added 40 parts of a dimethylpolysiloxane blocked with a dimethylvinylsiloxy group at each end, having a viscosity of 1,000 centipoise at 25° C. and a degree of polymerization of about 200, 120 parts of aluminum hydroxide (H32 by Showa Denko K. K.), and 10 parts of a dimethylpolysiloxane-diphenylsiloxane copolymer blocked with a dimethylvinylsiloxy group at each end (in the backbone, the diphenylsiloxane units accounting for 20 mol % of the dimethylsiloxane units and diphenylsiloxane units combined) as a thixotropic agent (E), having a viscosity of 1,000 centipoise at 25° C. After one hour of mixing at room temperature, 1 part of fumed silica (Aerosil 300 by Nippon Aerosil K. K.) as a thixotropic agent (E), 2.5 parts of methylhydrogenpolysiloxane of formula (4), 0.1 part of a 1% isopropyl alcohol solution of chloroplatinic acid, and 0.05 part of ethynyl cyclohexanol as a reaction inhibitor were added. Mixing was done at room temperature until uniform, obtaining a silicone rubber composition. When tested by the Boeing flow jig test, the composition showed a sag of 0.5 inch after 1 minute.

As in Example 1, the silicone rubber composition was press molded into rubber sheets, which were measured for physical properties and subjected to the tracking test and the erosion loss test. The results are shown in Tables 1 and 2.

Also, as in Example 1, the silicone rubber composition was applied and shaped to fill up the chipped portions 3, 3' of the insulator disks shown in FIG. 1 and allowed to stand one day. The fill firmly bonded to the silicone rubber of the disks, indicating satisfactory repair. It is noted that in order to maintain the shape, the fill in the chipped portion 3' was partially cured at the surface using a dryer, before it was allowed to stand one day.

Example 5

To 40 parts of the liquid silicone rubber base (I) obtained in Example 1 were added 40 parts of a dimethylpolysiloxane blocked with a dimethylvinylsiloxy group at each end, having a viscosity of 1,000 centipoise at 25° C. and a degree of polymerization of about 200, 120 parts of aluminum hydroxide (H32 by Showa Denko K. K.), and 5 parts of fumed silica (Aerosil 300 by Nippon Aerosil K. K.) as a thixotropic agent (E). After one hour of mixing at room temperature, 2.5 parts of methylhydrogenpolysiloxane of formula (4), 0.3 part of a 1% isopropyl alcohol solution of chloroplatinic acid, and 0.05 part of ethynyl cyclohexanol as a reaction inhibitor were added. Mixing was done at room temperature until uniform, obtaining a silicone rubber composition. When tested by the Boeing flow jig test, the composition showed a sag of 0.6 inch after 1 minute.

As in Example 1, the silicone rubber composition was press molded into rubber sheets, which were measured for physical properties and subjected to the tracking test and the erosion loss test. The results are shown in Tables 1 and 2.

Also, as in Example 1, the silicone rubber composition was applied and shaped to fill up the chipped portions 3, 3' of the insulator disks shown in FIG. 1 and allowed to stand one day. The fill firmly bonded to the silicone rubber of the disks, indicating satisfactory repair. It is noted that in order to maintain the shape, the fill in the chipped portion 3' was partially cured at the surface using a dryer, before it was allowed to stand one day.

Comparative Example 1

To 40 parts of the liquid silicone rubber base (I) obtained in Example 1 were added 40 parts of a dimethylpolysiloxane blocked with a dimethylvinylsiloxy group at each end, having a viscosity of 1,000 centipoise at 25° C. and a degree of polymerization of about 200 and 120 parts of aluminum hydroxide (H42M by Showa Denko K. K.). After one hour of mixing at room temperature, 2.5 parts of methylhydrogenpolysiloxane of formula (4), 0.3 part of a 1% isopropyl alcohol solution of chloroplatinic acid, and 0.05 part of ethynyl cyclohexanol as a reaction inhibitor were added. Mixing was done at room temperature until uniform, obtaining a silicone rubber composition. When tested by the Boeing flow jig test, the composition showed a sag of more than 3 inches after 1 minute.

As in Example 1, the silicone rubber composition was press molded into rubber sheets, which were measured for physical properties and subjected to the tracking test and the erosion loss test. The results are shown in Tables 1 and 2.

Also, as in Example 1, the silicone rubber composition was applied to the chipped portions of the insulator disks shown in FIG. 1. However, the material flowed down, resulting in a failure of repair. An attempt to cure the surface using a dryer failed because the material flowed down prior to curing.

Comparative Example 2

A kneader/mixer was charged with 80 parts of a dimethylpolysiloxane blocked with a dimethylvinylsiloxy group at each end, having a viscosity of 10,000 centipoise at 25° C. and a degree of polymerization of about 500, 40 parts of precipitated silica (Nipsil LP by Nippon Silica K. K.), 2 parts of hexamethyldisilazane, and 1 part of water. The contents were mixed for one hour at room temperature (25° C.), then heated until an internal temperature of 150° C. was reached, and mixed for a further 3 hours at the temperature, yielding a liquid silicone rubber base (III).

To 40 parts of the liquid silicone rubber base (III) were added 40 parts of a dimethylpolysiloxane blocked with a dimethylvinylsiloxy group at each end, having a viscosity of 1,000 centipoise at 25° C. and a degree of polymerization of about 200, and 120 parts of aluminum hydroxide (H42M by Showa Denko K. K.). After one hour of mixing at room temperature, 2.5 parts of methylhydrogen-polysiloxane of formula (4), 0.3 part of a 1% isopropyl alcohol solution of chloroplatinic acid, and 0.05 part of ethynyl cyclohexanol as a reaction inhibitor were added. Mixing was done at room temperature until uniform, obtaining a silicone rubber composition. When tested by the Boeing flow jig test, the composition showed a sag of more than 3 inches after 1 minute.

As in Example 1, the silicone rubber composition was press molded into rubber sheets, which were measured for physical properties and subjected to the tracking test and the erosion loss test. The results are shown in Tables 1 and 2.

Also, as in Example 1, the silicone rubber composition was applied to the chipped portions of the insulator disks shown in FIG. 1. However, the material flowed down, resulting in a failure of repair. An attempt to cure the surface using a dryer failed because the material flowed down prior to curing.

Comparative Example 3

To 40 parts of the liquid silicone rubber base (I) obtained in Example 1 were added 40 parts of a dimethylpolysiloxane blocked with a dimethylvinylsiloxy group at each end, having a viscosity of 1,000 centipoise at 25° C. and a degree of polymerization of about 200, and 20 parts of aluminum hydroxide (H42M by Showa Denko K. K.), followed by one hour of mixing at room temperature. To this, 2 parts of fumed silica (Aerosil 300 by Nippon Aerosil K. K.) as a thixotropic agent (E) and 0.5 part of polyethylene glycol as a thixotropic agent (E) were added, followed by 30 minutes of mixing. Further, 2.5 parts of methylhydrogenpolysiloxane of formula (4), 0.3 part of a 1% isopropyl alcohol solution of chloroplatinic acid, and 0.05 part of ethynyl cyclohexanol as a reaction inhibitor were added. Mixing was done at room temperature until uniform, obtaining a silicone rubber composition. When tested by the Boeing flow jig test, the composition showed a sag of 0.5 inch after 1 minute.

As in Example 1, the silicone rubber composition was press molded into rubber sheets, which were measured for physical properties and subjected to the tracking test and the erosion loss test. The results are shown in Tables 1 and 2.

Also, as in Example 1, the silicone rubber composition was applied and shaped to fill up the chipped portions 3, 3' of the insulator disks shown in FIG. 1 and allowed to stand one day. The fill firmly bonded to the disks, indicating satisfactory repair. It is noted that in order to maintain the shape, the fill in the chipped portion 3' was partially cured at the surface using a dryer, before it was allowed to stand one day.

TABLE 1

| | Physical properties | | | | | | | |
|---|---|---|---|---|---|---|---|---|
| | E1 | E2 | E3 | E4 | E5 | CE1 | CE2 | CE3 |
| Hardness (JIS A) | 58 | 55 | 51 | 54 | 61 | 56 | 60 | 38 |
| Tensile strength (kgf/cm²) | 42 | 45 | 39 | 40 | 48 | 51 | 35 | 60 |
| Elongation (%) | 180 | 200 | 250 | 190 | 150 | 180 | 140 | 350 |

TABLE 2

| | E1 | E2 | E3 | E4 | E5 | CE1 | CE2 | CE3 |
|---|---|---|---|---|---|---|---|---|
| Tracking time (hr) | 12.8 | 11.5 | 10.8 | 8.5 | 12.6 | 12.4 | 11.0 | 1.0 |
| Erosion weight loss (wt %) | 0.02 | 0.03 | 0.04 | 0.08 | 0.03 | 0.03 | 0.05 | 2.95 |

Japanese Patent Application No. 10-253263 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:
1. A silicone rubber composition for use as a high-voltage electrical insulator, comprising
   (A) 100 parts by weight of an organopolysiloxane represented by the following average compositional formula (1):

$$R^1{}_a SiO_{(4-a)/2} \qquad (1)$$

wherein $R^1$ is a substituted or unsubstituted monovalent hydrocarbon group, 0.01 to 10 mol % of $R^1$ is alkenyl, at least 90 mol % of $R^1$ is methyl, and a is a positive number of 1.9 to 2.4, said organopolysiloxane having on the average at least two alkenyl groups in a molecule and a degree of polymerization of up to 1,200,
   (B) 0.1 to 50 parts by weight of an organohydrogenpolysiloxane having at least two hydrogen atoms each attached to a silicon atom of the following average compositional formula (2):

$$R^2{}_b H_c SiO_{(4-b-c)/2} \qquad (2)$$

wherein $R^2$ is a substituted or unsubstituted monovalent hydrocarbon group having 1 to 10 carbon atoms, b is a positive number of 0.7 to 2.1, c is a positive number of 0.001 to 1.0, and the sum of b+c is from 0.8 to 3.0, said organohydrogenpolysiloxane being liquid at room temperature, (C) 40 to 400 parts by weight of aluminum hydroxide, (D) a catalytic amount of an addition reaction catalyst, (E) 0.1 to 50 parts by weight of a thixotropic agent, and (F) 0 to 30 parts by weight of a tackifier, said composition exhibiting a thixotropy corresponding to a sag of up to 1 inch after 1 minute as measured by the Boeing flow jig test.

2. The silicone rubber composition of claim 1 wherein the aluminum hydroxide (C) has been surface treated with at least one member selected from the group consisting of organosilazanes, organoalkoxysilanes, organochlorosilanes, titanate coupling agents and partial hydrolyzates thereof, and organic acids.

3. The silicone rubber composition of claim 1 wherein the aluminum hydroxide (C) has a mean particle size of 0.1 to 20 $\mu$m.

4. The silicone rubber composition of claim 1 wherein the thixotropic agent (E) is liquid at room temperature.

5. The silicone rubber composition of claim 1 wherein the thixotropic agent (E) is solid at room temperature.

6. The silicone rubber composition of claim 1 wherein the thixotropic agent (E) comprises a mixture of a first thixotropic agent which is solid at room temperature and a second thixotropic agent which is liquid at room temperature.

7. A sealant for use with a polymeric insulator, comprising the silicone rubber composition of claim 1.

8. A repairing compound for use with a polymeric insulator, comprising the silicone rubber composition of claim 1.

9. The silicone rubber composition of claim 5 wherein the solid thixotropic agent (E) is selected from the group consisting of fumed silica, fumed titanium dioxide, and carbon.

10. The silicone rubber composition of claim 4 wherein the liquid thixotropic agent (E) is selected from the group consisting of glycidol, ethylene glycol, glycerol, acetoacetic acid esters, hydroxyalkyl (meth)acrylate alkyl phthalates, polyethylene oxide, polypropylene oxide, polyethylene glycol, polypropylene glycol, block copolymers of these polyethers with polysiloxane compounds, pyromellitic dianhydride, benzophenonetetracarboxylic acid dianhydride, 3,3',4,4'-biphenyltetracarboxylic acid dianhydride, bis(3,4-dicarboxyphenyl)ether dianhydride, bis(3,4-dicarboxyphenyl)methane dianhydride, bis(3,4-dicarboxyphenyl)propane dianhydride, copolymers of dimethylsiloxane and diphenylsiloxane, and $\alpha,\omega$-dihydroxydimethylpolysiloxanes.

11. The silicone rubber composition of claim 1 wherein the thixotropic agent (E) comprises fumed silica and polyethylene glycol.

12. The silicone rubber composition of claim 1 wherein the thixotropic agent (E) comprises fumed silica and a dimethylpolysiloxane blocked with a dimethylhydroxysiloxy group at each end.

13. The silicone rubber composition of claim 1 wherein the thixotropic agent (E) comprises benzenetetracarboxylic acid dianhydride.

14. The silicone rubber composition of claim 1 wherein the thixotropic agent (E) comprises a dimethylpolysiloxane-diphenylsiloxane copolymer end-blocked with dimethylvinylsiloxy groups, the diphenylsiloxane units comprising 20 mol-% of the total dimethylsiloxane units and diphenylsiloxane units in the backbone of the copolymer.

15. The silicone rubber composition of claim 1 wherein the thixotropic agent (E) comprises fumed silica.

* * * * *